(12) United States Patent
Lim et al.

(10) Patent No.: US 6,522,498 B1
(45) Date of Patent: Feb. 18, 2003

(54) MAGNETIC SHIELD FOR FLUX LEAKAGE REDUCTION FROM SPINDLE MOTOR

(75) Inventors: Poh Lye Lim, Singapore (SG); Victor Chi Siang Choo, Singapore (SG); Niroot Jierapipatanakul, Singapore (SG); Yu Nang Zai, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 81 days.

(21) Appl. No.: 09/715,279

(22) Filed: Nov. 17, 2000

Related U.S. Application Data
(60) Provisional application No. 60/166,806, filed on Nov. 22, 1999.

(51) Int. Cl.[7] .............................................. G11B 33/14
(52) U.S. Cl. .................................. 360/97.02; 360/99.08
(58) Field of Search .......................... 360/97.01, 97.02, 360/99.08

(56) References Cited

U.S. PATENT DOCUMENTS

| | | |
|---|---|---|
| 4,033,111 A | 7/1977 | Matsuura |
| 4,553,183 A | 11/1985 | Brown et al. |
| 4,734,606 A | 3/1988 | Hajec |
| 4,874,976 A * | 10/1989 | Ohsawa ..................... 310/268 |
| 5,291,357 A | 3/1994 | Uda |
| 5,334,896 A | 8/1994 | Ohsawa |
| 5,432,644 A | 7/1995 | Tajima et al. |
| 5,574,322 A | 11/1996 | Nii et al. |
| 5,760,504 A | 6/1998 | Moser |
| 5,777,822 A * | 7/1998 | Schuh ..................... 360/97.03 |
| 5,875,069 A | 2/1999 | Suzuki et al. |
| 5,876,124 A | 3/1999 | Zang et al. |
| 6,002,546 A * | 12/1999 | Yagi ........................ 360/97.02 |
| 6,411,463 B1 * | 6/2002 | Janik ....................... 360/97.01 |

\* cited by examiner

*Primary Examiner*—A. J. Heinz
(74) *Attorney, Agent, or Firm*—Shawn B. Dempster (57) ABSTRACT

The present invention provides a magnetic shield that would reduced the magnetic flux leakage from the base of the spindle motor to the printed circuit board assembly (PCBA) in a disc drive. The magnetic shield integrated in the disc drive as part of the spindle motor without increasing costs to assembly of the disc drive. The magnetic shield is made of layers of different materials to provide effective shielding. The magnetic shield is designed such that shielding effect is not affected during temperature changes in the disc drive.

15 Claims, 7 Drawing Sheets

MAGNETIC SHIELD FOR FLUX LEAKAGE REDUCTION FROM SPINDLE MOTOR

This patent application claims priority from U.S. Provisional application No. 60/166,806, filed Nov. 22$^{nd}$, 1999.

FIELD OF INVENTION

The present invention relates generally to spindle motors in disc drives, and more particularly to the shielding magnetic flux from the spindle motor in the direction towards the printed circuit board assembly (PCBA).

BACKGROUND OF THE INVENTION

In a disc drive, there consist of a multiple number of discs mounted on a spindle. The spindle is a motor with a circular base where permanent magnets are disposed in a radial manner about the center of the base forming a concentric circular structure. Between the permanent magnets copper wires are wound to form a stator winding such that a current passing through the copper wires would produce magnetic flux which will interact with the magnetic flux of the permanent magnets. In the center of the circular structure of the permanent magnets is a shaft secured to the base of the spindle. The shaft is fitted with ball-bearings to facilitate rotation about the center of a hub. The hub is press-fitted onto the shaft. The assembled hub rotates when the magnetic fluxes interaction produce a resultant force tangential to the circular arrangement of the permanent magnets. A printed circuit board assembly (PCBA) is used to control signals from the processor to drive the motor and thus enabling the discs to rotate about the spindle. Information or data is stored on the discs through the use of transducers or a magnetic read/write heads to write and retrieve information on/from discs surface. The transducer is mounted on an actuator arm, which flies above the disc surface to write and retrieve data. The magnetic flux from the spindle motor tends to leak in all directions as well as in the direction of the PCBA on every excitation and this will interfere with the operation of the transducer.

In order to reduce this interference, attempts have been made to reduce the magnetic flux leakage from the spindle motor by providing magnetic shields. Existing prior art teaches the use of magnetic shields in the form of plates, coatings or ring guides to reduce the amount of stray magnetic flux from the spindle motor. The materials used in these prior art magnetic shields are either steel or iron. The magnetic shields in prior arts are mostly directed to shielding off interference of stray flux from transducers and disc surfaces. Therefore, these magnetic shields are located on the upper portion of the spindle. However, stray magnetic flux also affect the signals in the PCBA located at the base of the spindle motor. U.S. Pat. No. 4,553,183 describes the use of a magnetic shield disposed within the spindle motor as a base plate for reduction of magnetic flux leakage. The material used for the base plate is steel or iron. In this patent, the magnetic shield is an integral part of the disc drive directed at preventing stray magnetic flux from the spindle motor and transducer to interfere or erase information stored on the discs. The base plate provided in this patent is positioned above the stator which leaves stray magnetic flux in the direction of the PCBA unshielded.

The interference due to stray magnetic flux from the spindle motor with signals of the PCBA poses a problem for effective operation of data storage and retrieval. Due to such interactions of stray magnetic flux, the position error signals (PES) are affected and cannot be within desired thresholds.

There remains a need for an improved reduction of magnetic flux leakage from the base of the spindle motor to minimize interference of the operation of the PCBA. It will be evident from the following description that the present invention offers this and other advantages.

SUMMARY OF THE INVENTION

According to one aspect of the invention, there is provided a magnetic shield for a spindle motor in a disc drive which is made multiple layers of materials. The magnetic shield is integrated into the disk drive to reduce magnetic flux leakage to the printed circuit board assembly (PCBA). The multiple layers of materials include polyester, pressure sensitive adhesives and steel configured in a multiple number of ways. The magnetic shield is adhered to the base of the spindle motor of a disc drive such that it covers the base of the spindle motor exposing the physical contacts of the spindle motor to allow interface connection with the PCBA. The region of the magnetic shield surrounding the physical contacts has additional layers of materials, which are selected from a group of polyester, steel and pressure sensitive adhesives.

In another aspect of the present invention, there is provided a disc drive with different parts that includes a spindle motor, a printed circuit board assembly (PCBA) and a magnetic shield. The spindle motor has a base with physical contacts that are connected to the printed circuit board. The magnetic shield, of multiple layers of materials, is integrated to the spindle motor to reduce leakage of magnetic flux from the base of the spindle motor to the PCBA. The magnetic shield is adhered to the base of the spindle motor and the multiple layers of materials in the magnetic shield is selected from a group comprising polyester, pressure sensitive adhesives and steel. The region surrounding the physical contacts of the spindle motor is exposed for interface connection to the PCBA. There are numerous configurations of the layers of materials that would provide effective magnetic shielding. Additional layers of materials are integrated at the region surrounding the physical contacts. These additional materials are selected from a group comprising polyester and pressure sensitive adhesives.

In yet another aspect of the present invention, there is provided a disc drive that includes a spindle motor having physical contacts to connect to a printed circuit board assembly (PCBA) such that magnetic flux leakage from the spindle motor to the PCBA is reduced by integrating a magnetic shield to the base of the spindle motor.

The magnetic shield of the present invention is assembled using existing assembly process with minimum increase in cost. The simplicity of the design of the current invention also provides ease in assembly. The effective result of the present invention is shown in the following detailed description of the invention.

DETAILED DESCRIPTION

Figure 1:
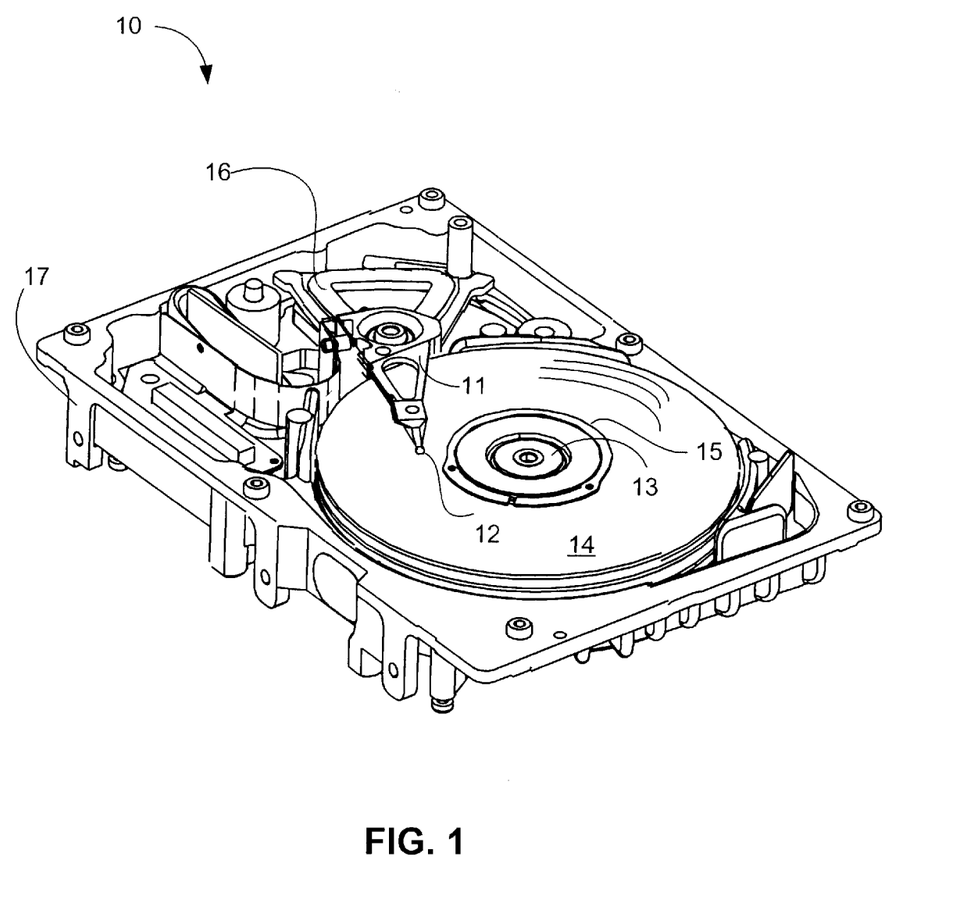
FIG. 1 is a top view of a typical disc drive which the present invention is applied.

The hard disc assembly (HDA) 17 of a typical disc drive 10 is illustrated in FIG. 1. The basic parts includes a voice coil 16, actuator arm 11 with transducer 12 at one end which flies above a disc surface 14 as the disc 14 rotates about a spindle 13. The disc is secured to the spindle by a disc clamp 15. The voice coil is used to drive the movement of the actuator arm 11 to a designated position above the disc surface 14 such that the transducer can perform the read/write operations.

Figure 2:
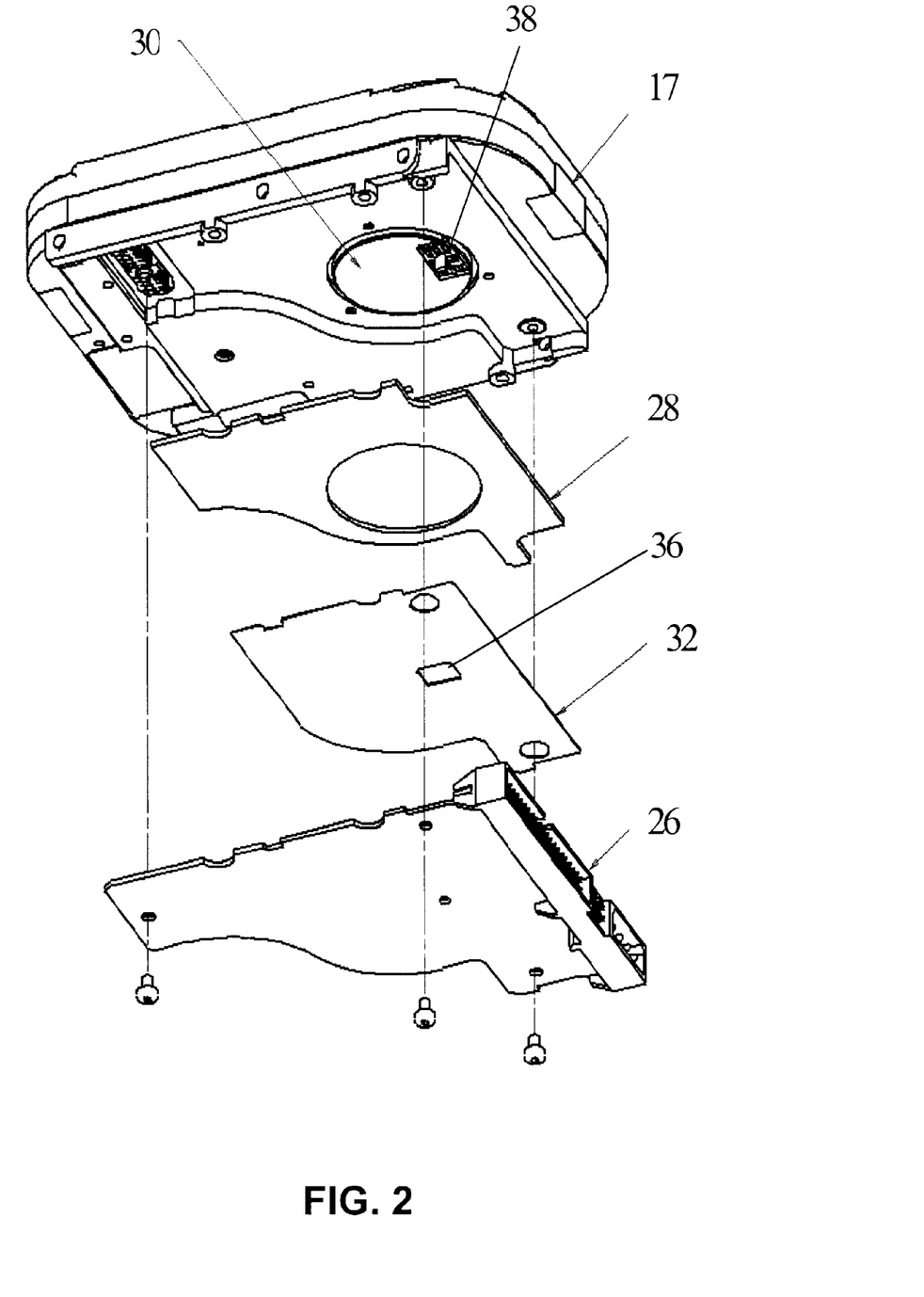
FIG. 2 is an exploded view of a disc drive from the base showing the base of a spindle motor fitted to the HDA (hard disc assembly).

FIG. 2 shows an exploded view of the parts in a typical disc drive 10 from the bottom which includes a printed circuit board assembly (PCBA) 26, a valox 32 with a window 36 for fitting over physical contacts 38 protruding out from the base of the spindle motor 30. The spindle motor is used to drive the spindle 13 to rotate the disc 14. Between the valox 32 and the base of the spindle motor 30 is a acoustic foam 28 for noise reduction. The HDA 17 rests on the acoustic foam 28 such that the base of the spindle motor 30 is exposed. The physical contacts 38 establish the motor-PCBA interface connection, which allows the spindle motor 30 to be driven by the PCBA 26. Within the spindle motor 30 is a stator winding in between permanent magnets arranged in a circular concentric manner such that a resultant force tangential to the circular arrangement of the magnets and stator winding would rotate the spindle 13 when current passes through the stator winding. The magnetic flux within the spindle motor tends to leak out of the motor which interferes with the operation of other parts of the HDA 17 as well as the PCBA 26. Stray magnetic flux in the direction of the PCBA cause the position error signal (PES) to fail desired threshold, in particular at the 360 Hz component. Such stray magnetic flux from the spindle motor resulted in the need for magnetic shielding.

Figure 3:
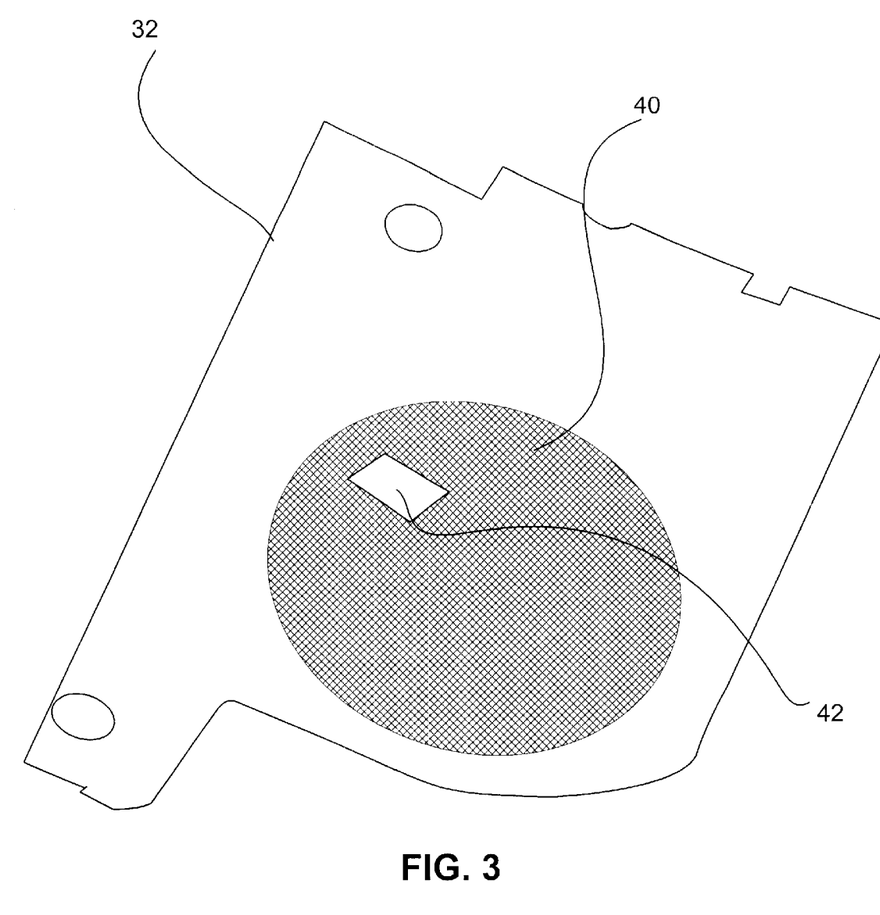
FIG. 3 is a plan view of a valox with a magnetic shield incorporated, prior art magnetic shield.

Existing prior art shown in FIG. 3 uses a stainless steel plate as shielding medium adhered to a piece of valox. The valox is similar to that shown in FIG. 2 with an added magnetic shield where the window on the valox remains. This method of shielding has proven to be effective in reducing the effects of magnetic flux leakage.

Figure 4:
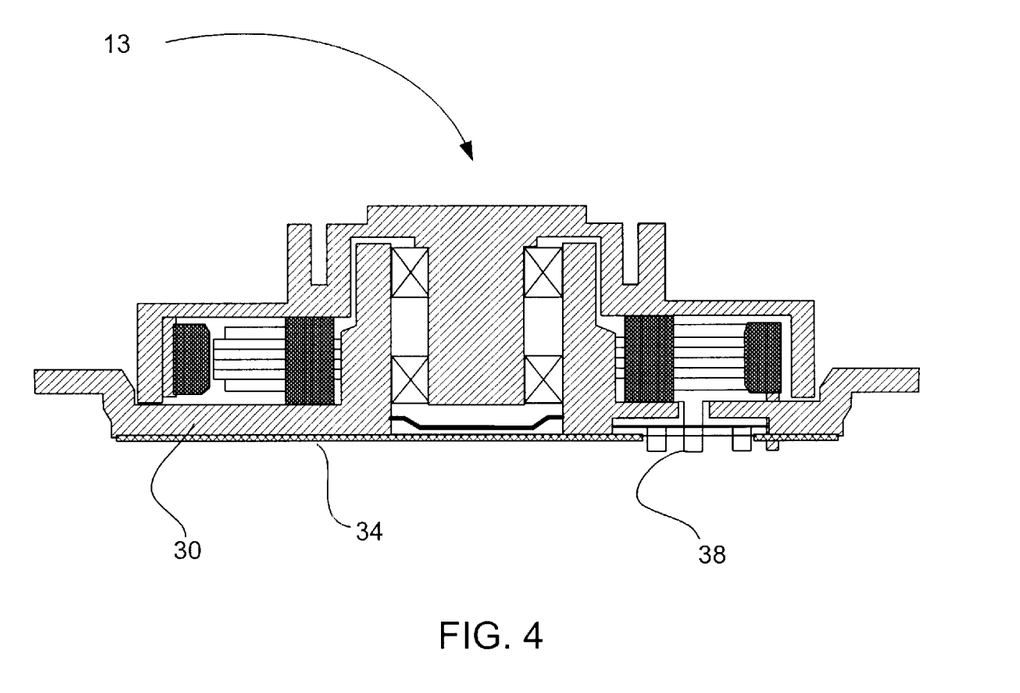
FIG. 4 is a cross-sectional view of the spindle motor of the present invention.

FIG. 4 shows the magnetic shield 34 of the present invention adhered to the base 30 of the spindle motor 13. The magnetic shield covers the base 30 of the spindle motor 13 completely exposing only the area where the physical contacts 38 protrude out from the base 30 for the interface connection to the PCBA.

Figure 5:
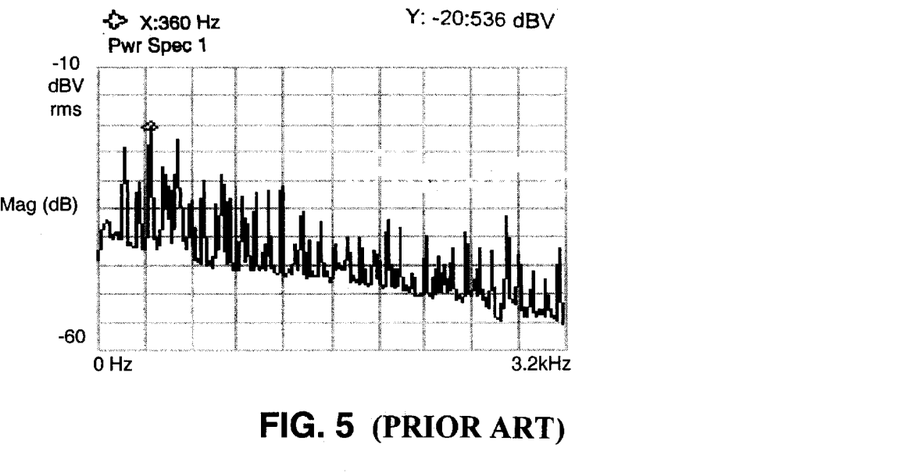
FIG. 5 is a plot illustrating the PES (position error signal) against frequency of the spindle motor without a magnetic shield.
Figure 6:
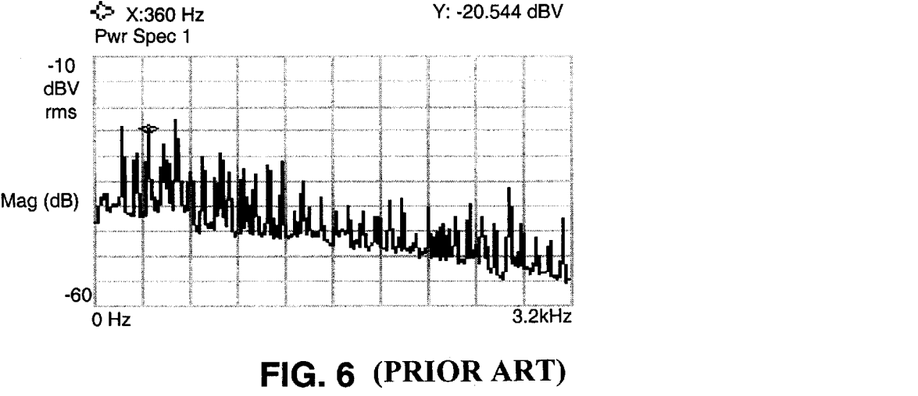
FIG. 6 is a plot illustrating the PES against frequency of the spindle motor with magnetic shield disclosed in prior art.
Figure 7:
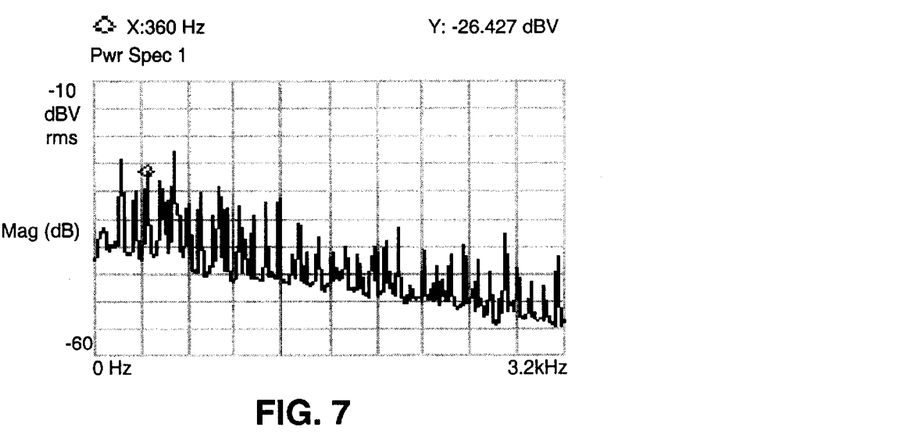
FIG. 7 is a plot illustrating the PES against frequency of the spindle motor with magnetic shield of the present invention.

FIG. 5 shows the PES spectrum plot where the effect of stray magnetic flux without magnetic shielding is approximately −20 dB at the 360 Hz frequency component. With prior art magnetic shielding from FIG. 3, the PES spectrum plot show less magnetic interference at the 360 Hz frequency component (i.e. −24 dB as shown in FIG. 6). The magnetic shield of the present invention is able to reduce the magnetic flux interference further as shown in FIG. 7.

Figure 8:
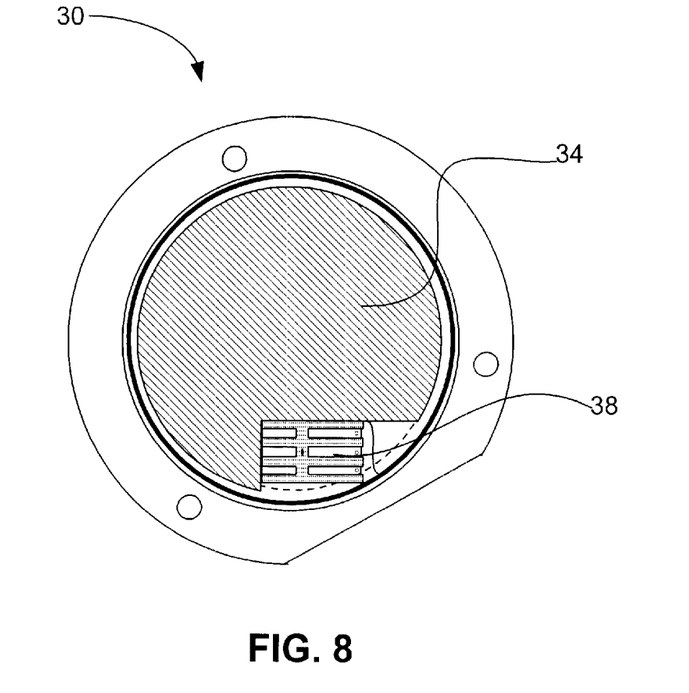
FIG. 8 is a plan view of the base of the spindle motor with the magnetic shield.
Figure 9:
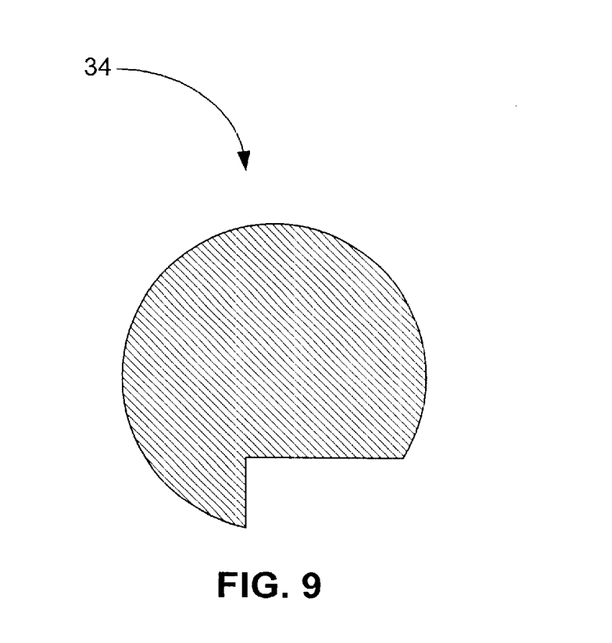
FIG. 9 is a plan view of the magnetic shield of the present invention.

FIG. 8 shows the magnetic shield of the present invention 34 integrated to the base of the spindle motor 30. The magnetic shield is cut off as shown in FIG. 9 such that when integrated to the base of the spindle motor the physical contacts are allowed to protrude from the base of the spindle motor to connect to the PCBA 26. The integration of the magnetic shield directly to the base of the spindle motor ensures that stray magnetic flux lines are captured and contained within the motor. The magnetic shield is made of a number of layers of materials and these can be of different configuration. The materials include polyester film, pressure sensitive adhesives and steel.

Figure 10:
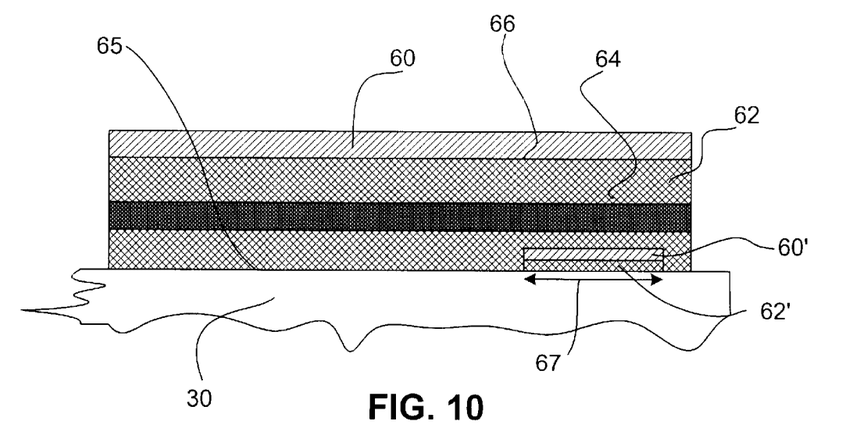
FIG. 10 is a cross-sectional view of another embodiment of the magnetic shield of the present invention.

In the most preferred embodiment the magnetic shield shown in FIG. 10 has a steel layer 64 sandwiched between two layers of film pressure sensitive adhesives 62. A layer of polyester film 60 adheres to the exposed side 66 of one of the pressure sensitive adhesives layers such that the polyester film 60 is furthest away from the base of the spindle motor 30 when integrated to the base. The exposed side 65 of the second pressure sensitive adhesive layer adheres to the base of the spindle motor 30. On this second side 65 of the pressure sensitive adhesive layer 62, at the region 67 near to the physical contacts is adhered an additional polyester layer 60' followed by a layer of pressure sensitive adhesive 62' of the same area as the polyester film 60' such that the region would be adhered to the base of the spindle motor 30 on the exposed side of the same pressure sensitive adhesive layer 62'. This configuration is most preferred in view of costs efficiency and performance in shielding stray magnetic flux.

Figure 11:
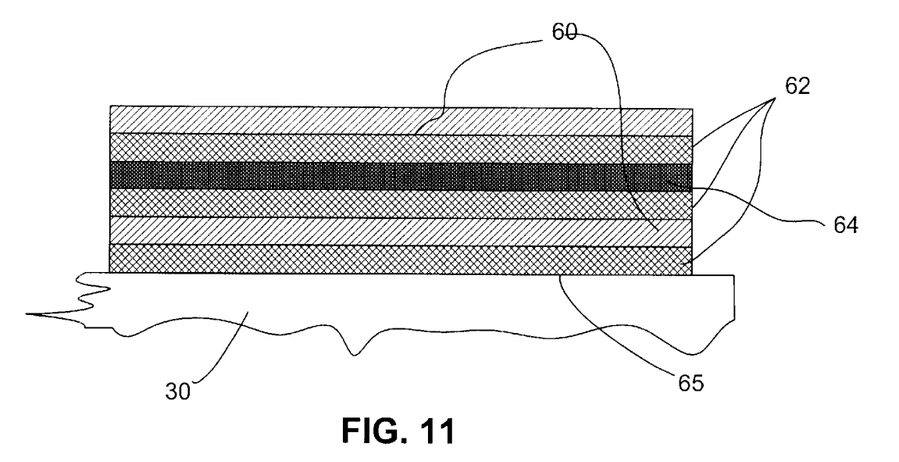
FIG. 11 is a cross-sectional view of one embodiment of the magnetic shield of the present invention.
Figure 12:
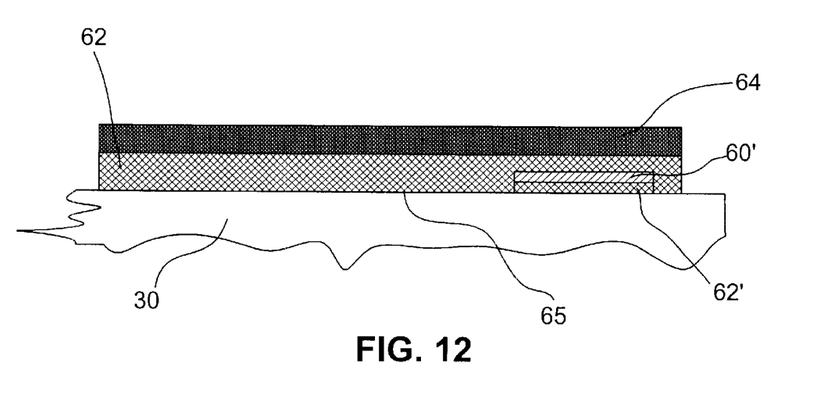
FIG. 12 is a cross-sectional view of another embodiment of the magnetic shield of the present invention.

Other configurations that provide effective shielding are shown in FIG. 11 and FIG. 12.

In FIG. 11, a steel layer 64 is sandwiched in between two layers of pressure sensitive adhesives 62 which is further sandwiched between two layers of polyester films 60 and then adhered to the base of the spindle motor 30 with a layer of pressure sensitive adhesive 62. The exposed side 65 of the pressure sensitive adhesive layer adheres to the base of the spindle motor 30. Therefore, the layer furthest from the base of the spindle motor 30 is the polyester film 60.

In a third configuration shown in FIG. 12, the steel layer 64 is the outermost layer furthest away from the base of the spindle motor 30, which is adhered to one side of a layer of pressure sensitive adhesives 62. On the opposite side to the adhesive layer 62, near the region of the physical contacts, is a layer of polyester film 60'. Between this polyester layer 60' and the base of the spindle motor 30 is another pressure sensitive adhesive layer 62' to adhere the region to the base of the spindle 30 as in the other region of the magnetic shield.

Various types of polyester film may be used in the above configurations. The most preferred polyester is Troay Lumilar "H" with a minimum thickness of 25 $\mu$m. Stainless steel is used for the steel layer magnetic shield where the minimum thickness of the steel is 20 $\mu$m. The thickness of the pressure sensitive adhesive layer is variable depending on the thickness of the layer of the steel and the polyester film. The overall thickness of the magnetic shield range from 220 $\mu$m to 270 $\mu$m. The maximum thickness of the magnetic shield should not exceed 0.3 mm. Therefore, the thickness of the various layers can vary to obtain different shielding strength. The strength of the magnetic shield would be dependent on the thickness of the steel layer and the various component layers and the configuration.

Various embodiments of the present invention are described below:

In one embodiment of the invention, a magnetic shield for a spindle motor in a disc drive has multiple layers of materials. The magnetic shield is integrated as part of the disk drive to reduce magnetic flux leakage from the spindle motor to the printed circuit board assembly (PCBA). The multiple layers of materials including polyester, pressure sensitive adhesives and steel can alternate in configuration in a multiple number of ways. The layer of material between the spindle motor and the magnetic shield is a layer of pressure sensitive adhesive to adhere the magnetic shield to the base of the spindle motor such that the base of the spindle motor is covered except the physical contacts of the spindle motor. This allows interface connection between the physical contacts and the PCBA. The region of the magnetic shield surrounding the physical contacts has additional layers of materials, which are selected from a group of polyester, steel and pressure sensitive adhesives to reduce stray magnetic flux from leaking out at the physical contacts.

Another embodiment of the present invention provides a disc drive with a spindle motor, a printed circuit board assembly (PCBA) and a magnetic shield. The spindle motor has a base with physical contacts that are used to establish interface connection to the PCBA. The magnetic shield, of multiple layers of materials, is integrated to the spindle motor to reduce leakage of magnetic flux from the base of the spindle motor to the PCBA. The magnetic shield is adhered to the base of the spindle motor and the multiple layers of materials in the magnetic shield is selected from a group comprising polyester, pressure sensitive adhesives and steel. The region surrounding the physical contacts of the spindle motor is exposed for interface connection to the PCBA. Numerous possible configurations of the layers of materials would provide effective magnetic shielding. Additional layers of materials are integrated at the region surrounding the physical contacts. These additional materials are selected from a group comprising polyester and pressure sensitive adhesives.

In an alternative embodiment of the present invention, a disc drive including a spindle motor with physical contacts to connect to a printed circuit board assembly (PCBA) such that magnetic flux leakage from the spindle motor to the PCBA is reduced by integrating a magnetic shield to the base of the spindle motor.

The foregoing description is only illustrative of various embodiments of the invention, and a person skilled in the art will understand that changes can be made to the details of structure, function and processes without going beyond the scope of the present invention.

What is claimed:

1. A magnetic shield for a spindle motor of a disc drive, the magnetic shield comprising a multiple layer of materials wherein the magnetic shield is integrated into the spindle motor to reduce magnetic flux leakage to a printed circuit board assembly (PCBA).

2. A magnetic shield according to claim 1 wherein the multiple layers of materials to is selected from a group comprising polyester, pressure sensitive adhesives and steel.

3. A magnetic shield according to claim 2 wherein the layers of materials can be configured in multiple number of ways.

4. A magnetic shield according to claim 1 wherein the magnetic shield is adhered to a spindle motor base.

5. A magnetic shield according to claim 4 wherein the magnetic shield covers the base of the spindle motor exposing the physical contacts of the spindle motor to connect to the PCBA.

6. A magnetic shield according to claim 5 wherein the region of the magnetic shield surrounding the physical contacts comprises additional layers of materials.

7. A magnetic shield according to claim 6 wherein the additional layers are selected from a group comprising polyester and pressure sensitive adhesives.

8. A disc drive comprising
   a spindle motor having a base with physical contacts;
   a printed circuit board assembly (PCBA) connected to the spindle motor at the physical contacts to control the spindle motor;
   a magnetic shield comprising multiple layers of materials to reduce magnetic flux leakage from the spindle motor to the PCBA.

9. A disc drive according to claim 8 wherein the magnetic shield is adhered to the base of the spindle motor.

10. A disc drive according to claim 8 wherein the multiple layers of material in the magnetic shield is selected from a group comprising polyester, pressure sensitive adhesives and steel.

11. A disc drive according to claim 10 wherein the layers of materials can be configured in multiple number of ways.

12. A disc drive according to claim 8 wherein the region surrounding the physical contacts of the spindle motor is exposed for connecting to the PCBA.

13. A disc drive according to claim 8 wherein the region of the magnetic shield in close proximity to the physical contacts comprises additional layers of materials.

14. A disc drive according to claim 13 wherein the materials of additional layers are selected from a group comprising polyester and pressure sensitive adhesives.

15. A disc drive comprising a spindle motor having physical contacts to connect to a printed circuit board assembly (PCBA) wherein the magnetic flux leakage from the spindle motor to the PCBA is reduced by means of integrating a magnetic shield to the base of the spindle motor.

* * * * *